(12) United States Patent
Xue et al.

(10) Patent No.: US 9,077,180 B2
(45) Date of Patent: Jul. 7, 2015

(54) PHASE LOCKING SYSTEM FOR THREE-PHASE ALTERNATING CURRENT ELECTRIC GRID AND METHOD THEREOF

(71) Applicant: DELTA ELECTRONICS (SHANGHAI) CO., LTD., Shanghai (CN)

(72) Inventors: Hai-Fen Xue, Shanghai (CN); Ai-Bin Qiu, Shanghai (CN); Fei Lu, Shanghai (CN); Jian-Fei Zheng, Shanghai (CN)

(73) Assignee: DELTA ELECTRONICS (SHANGHAI) CO., LTD. (CN)

( * ) Notice: Subject to any disclaimer, the term of this patent is extended or adjusted under 35 U.S.C. 154(b) by 435 days.

(21) Appl. No.: 13/671,823

(22) Filed: Nov. 8, 2012

(65) Prior Publication Data
US 2013/0121046 A1    May 16, 2013

(30) Foreign Application Priority Data
Nov. 10, 2011    (CN) .......................... 2011 1 0355522

(51) Int. Cl.
| | | |
|---|---|---|
| *G01R 19/00* | (2006.01) | |
| *H02J 3/00* | (2006.01) | |
| *H02J 3/38* | (2006.01) | |
| *H02P 9/00* | (2006.01) | |
| *H02P 29/02* | (2006.01) | |

(52) U.S. Cl.
CPC . *H02J 3/00* (2013.01); *H02J 3/386* (2013.01); *H02P 9/007* (2013.01); *H02P 29/023* (2013.01); *Y02E 10/763* (2013.01)

(58) Field of Classification Search
CPC ............. H02J 3/00; H02J 3/381; H02J 3/382; H02J 3/383; H02J 3/386; Y02E 40/50; Y02E 10/70; Y02E 10/763; H02P 29/023; H02P 9/00; H02P 9/04; H02P 11/00; H02P 9/007
See application file for complete search history.

(56) References Cited

U.S. PATENT DOCUMENTS

| | | | |
|---|---|---|---|
| 2009/0105979 A1* | 4/2009 | Escobar Valderrama et al. | ............................... 702/72 |
| 2010/0213925 A1* | 8/2010 | Teodorescu et al. | ....... 324/76.78 |

* cited by examiner

*Primary Examiner* — Tung X Nguyen
*Assistant Examiner* — Son Le
(74) *Attorney, Agent, or Firm* — Lowe Hauptman & Ham, LLP (57) ABSTRACT

A phase locking system for a three-phase alternating current (AC) electric grid and a method thereof are disclosed. The method includes: receiving a three-phase voltage of the AC electric grid and converting the three-phase voltage to a two-phase voltage signal, each of which including a positive and a negative sequence components; obtaining a pure positive sequence component by subtracting the negative sequence component from the voltage signal of each phase and using αβ/dq coordinate transformation and low-pass filtering, and phase locking the pure positive sequence component; and obtaining an error signal by subtracting a disturbance variable and subsequently subtracting the positive sequence component from the voltage signal of each phase, wherein the disturbance variable includes the negative sequence component, and obtaining a signal including the negative sequence component by performing a α-β/d-q coordinate transformation on the error signal and adjusting the error signal through a regulator.

20 Claims, 5 Drawing Sheets

PHASE LOCKING SYSTEM FOR THREE-PHASE ALTERNATING CURRENT ELECTRIC GRID AND METHOD THEREOF

RELATED APPLICATIONS

This application claims priority to China Application Serial Number 201110355522.X, filed Nov. 10, 2011, which is herein incorporated by reference.

BACKGROUND

1. Field of Invention

The present invention relates to phase locking technology. More particularly, the present invention relates to a phase locking system for a three-phase alternating current (AC) electric grid and a phase locking method thereof.

2. Description of Related Art

Currently, along with the development of science and technology and greatly rich in material life, the problem of energy and environment is becoming more and more serious. Consequently, exploitation and utilization of a renewable energy has become a top research and development direction in solving the above-mentioned problems. For example, a wind power generation is worthy of being one of plural renewable energies with its characteristics, such as clean and environment protection.

An existing wind power system mainly adopts a doubly fed induction generator (DFIG). A back-to-back double pulse-width modulated voltage source inverter is used as a primary control system of DFIG, and the inverter includes a grid-side converter and a rotor-side converter (or referred to as a generator-side converter). Under normal operating conditions, only a fundamental forward voltage exists in the electric grid, a voltage synchronizing signal, as a control basis, may be easily obtained by adopting a conventional voltage zero crossing detection or a phase locked loop (PLL) technique. However, in an actual electric grid, centralized application of devices such as a grid-connected inverter, an active filter and reactive compensation equipment in the wind power system often leads to asymmetric failures such as an unbalanced load or single-phase and bi-phase short circuits to earth, causing an asymmetric electric grid voltage.

Particularly, for the DFIG wind power system, on one hand, due to the asymmetric electric grid voltage, a stator voltage and a stator current also include a negative sequence component in addition to a positive sequence component, but a conventional proportional-integral current regulator cannot control the positive sequence component and the negative sequence component simultaneously, and thus a very small unbalance of the stator voltage will lead to a very large unbalance of the stator current, an electromagnetic torque and active power fluctuation, thereby leading to deterioration of the DFIG operation performance. On the other hand, when various current transformers of the DFIG are controlled, it is often needed to use a phase and amplitude of a voltage AC variable, and thus the phase locking technology is one of the key links. When the electric grid is unbalanced due to a failure in the three-phase electric grid, the electric grid voltage includes a positive sequence component and a negative sequence component, and in order to obtain phase information of the electric grid voltage accurately, the negative sequence component should be separated out from the electric grid voltage, so as to obtain a pure positive sequence component and thus phase lock based on the positive sequence component. However in an existing phase locking circuit design, the above-mentioned negative sequence component cannot be separated out completely, and a necessary separation measure is not adopted for a disturbance variable included in the electric grid voltage when the electric grid is unbalanced.

In view of this, it is a subject demanding prompt solution from relevant skill members in the art how to design a phase locking system for the three-phase AC electric grid, so as to separate out the disturbance variable in a voltage signal actively through the phase locking system, and thus obtain a pure fundamental positive sequence component for phase locking accurately.

SUMMARY

In order to solve the above-mentioned disadvantages of the phase locking system of the three-phase AC electric grid of the prior art, the present invention provides a phase locking system for the three-phase AC electric grid and a method thereof.

According to an aspect of the present invention, a phase locking system for the three-phase AC electric grid is provided. The phase locking system includes an input module, a first separation module and a second separation module. The input module is used for receiving three-phase voltages of the three-phase AC electric grid and converting the three-phase voltages into two-way voltages $V_{grid\alpha}$ and $V_{grid\beta}$, each of which including a positive sequence component and a negative sequence component. The first separation module is used for obtaining a positive sequence component $d_{pos}$ at a d-axis and a positive sequence component $q_{pos}$ at a q-axis by performing a coordinate transformation from a $\alpha$-$\beta$ coordinate system to a d-q coordinate system on a first variable to be separated, and subsequently outputting positive sequence components $V_{\alpha pos}$ and $V_{\beta pos}$ corresponding to the voltage of each way by performing the coordinate transformation on the positive sequence component $d_{pos}$ at the d-axis from the d-q coordinate system to the $\alpha$-$\beta$ coordinate system. The second separation module is used for outputting negative sequence components $V_{\alpha neg}$ and $V_{\beta neg}$ corresponding to the voltage of each way by performing the coordinate transformation from the $\alpha$-$\beta$ coordinate system to the d-q coordinate system and the coordinate transformation from the d-q coordinate system to the $\alpha$-$\beta$ coordinate system on a second variable to be separated. The first separation module and the second separation module are coupled as a closed loop feedback. The second separation module obtains the negative sequence component by adopting a closed loop compensation, and eliminates an error in the first separation module, making the first separation module separate out the positive sequence component for phase-locking.

In some embodiments, the phase locking system further includes a first superposing module and a second superposing module. The first superposing module has a first input end, a second input end and an output end. The first input end is electrically connected to the input module, the second input end is electrically connected to an output end of the second separation module, and the output end of the first superposing module is electrically connected to an input end of the first separation module. The first superposing module is used for receiving the voltage of each way and the respective negative sequence components thereof, and after superpose a first superposed signal is outputted as the first variable to be separated into the input end of the first separation module. The second superposing module has a first input end, a second input end and an output end. The first input end is electrically connected to the input end of the first separation module, the second input end is electrically connected to the output end of the first separation module, and the output end of the second superposing module is electrically connected to an input end of the second separation module. The second superposing module is used for receiving the first superposed signal and the positive sequence component, and after superpose a superposed signal is outputted as the second variable to be separated into the input end of the second separation module.

In some embodiments, the phase locking system further includes a third superposing module and a fourth superposing module. The third superposing module has a first input end, a second input end and an output end. The first input end is electrically connected to the input module, the second input end is electrically connected to the output end of the second separation module, and the output end of the third superposing module is electrically connected to the input end of the first separation module. The third superposing module is used for receiving the voltage of each way and the respective negative sequence components thereof, and after superpose a second superposed signal is outputted as the first variable to be separated into the input end of the first separation module. The fourth superposing module has a first input end, a second input end, a third input end and an output end. The first input end is electrically connected to the input module, the second input end is electrically connected to the output end of the first separation module, the third input end is electrically connected to the output end of the second separation module, and the output end of the fourth superposing module is electrically connected to the input end of the second separation module. The fourth superposing module is used for receiving the voltage of each way and the respective positive sequence components and negative sequence components thereof, and a superposed signal is outputted as the second variable to be separated into the input end of the second separation module.

In some embodiments, the first separation module further includes a low-pass filter for low-pass filtering the positive sequence component $d_{pos}$ at the d-axis. In some other embodiments, the first separation module further includes a first regulator, a comparing unit and an integrator. The first regulator is connected with the comparing unit, and the comparing unit is connected with the integrator. The positive sequence component $q_{pos}$ at the q-axis is coupled to an input terminal of the comparing unit through the first regulator, a predetermined frequency signal is connected to another input terminal of the comparing unit, and a phase angle $\theta_{pos}$ of the positive sequence component is outputted through the integrator by comparing the positive sequence component $q_{pos}$ and the predetermined frequency signal.

In a preferred embodiment, the phase angle $\theta_{pos}$ of the positive sequence component outputted by the integrator is inputted into a coordinate transformation process from the α-β coordinate system to the d-q coordinate system and the coordinate transformation process from the d-q coordinate system to the α-β coordinate system in the first separation module respectively.

In another preferred embodiment, a phase angle $-\theta_{pos}$, corresponding to the phase angle of the positive sequence component outputted by the integrator, is inputted into the coordinate transformation process from the α-β coordinate system to the d-q coordinate system and the coordinate transformation process from the d-q coordinate system to the α-β coordinate system in the second separation module respectively.

In some embodiments, the second separation module further includes a second regulator for compensating the disturbance variable.

In some embodiments, the first regulator or the second regulator is a proportional-integral regulator (PI) or a proportional-integral-derivative regulator (PID).

In some embodiments, the phase locking system is applied to a wind power generation system or a solar power generation system.

According to another aspect of the present invention, a phase locking method for the three-phase AC electric grid is provided, including:

a) receiving three-phase voltages of the three-phase AC electric grid and converting the three-phase voltages to two-way voltages $V_{grid\alpha}$ and $V_{grid\beta}$, each of which including the positive sequence component and the negative sequence component;

b) obtaining positive sequence components $V_{\alpha pos}$ and $V_{\beta pos}$ corresponding to the voltage of each way by performing the coordinate transformation from the α-β coordinate system to the d-q coordinate system and the coordinate transformation from the d-q coordinate system to the α-β coordinate system sequentially on a first variable to be separated;

c) obtaining negative sequence components $V_{\alpha neg}$ and $V_{\beta neg}$ corresponding to the voltage of each way by performing the coordinate transformation from the α-β coordinate system to the d-q coordinate system and the coordinate transformation from the d-q coordinate system to the α-β coordinate system sequentially on a second variable to be separated; and d) superposing the voltage of each way with the corresponding positive sequence components $V_{\alpha pos}$ and $V_{\beta pos}$ and negative sequence components $V_{\alpha neg}$ and $V_{\beta neg}$, so as to separate out the disturbance (error) variable in the voltage of each way and compensate the disturbance (error) variable.

In some embodiments, the phase locking method further includes: providing a reference disturbance variable preset as zero (i.e., providing a reference variable preset as zero); differencing the reference disturbance variable and the disturbance variable in the voltage of each way, so as to obtain an error signal, and eliminate the error by compensating the error signal through a regulator; and obtaining the negative sequence components $V_{\alpha neg}$ and $V_{\beta neg}$ by performing the coordinate transformation from the d-q coordinate system to the α-β coordinate system on a compensated signal.

In some embodiments, the phase locking method further includes a first superposing step for receiving the voltage of each way and the respective negative sequence components thereof, and after superpose outputting a first superposed signal as the first variable to be separated into the input end of the first separation module; and receiving the first superposed signal and the positive sequence component, and outputting a superposed signal as the second variable to be separated into the input end of the second separation module.

In some embodiments, the phase locking method further includes a second superposing step for receiving the voltage of each way and the respective negative sequence components thereof, and after superpose outputting a second superposed signal as the first variable to be separated into the input end of the first separation module; and receiving the voltage of each way and the respective positive sequence components and negative sequence components thereof, and outputting a superposed signal as the second variable to be separated into the input end of the second separation module.

In some embodiments, the step of b further includes a step of filtering for low-pass filtering the positive sequence component $d_{pos}$ at the d-axis obtained by the coordinate transformation from α-β coordinate system to the d-q coordinate system. In some other embodiments, the step of b further includes a step of generating a phase angle. The step of generating a phase angle is used for comparing the positive sequence component $q_{pos}$ at the q-axis obtained by the coordinate transformation from the α-β coordinate system to the d-q coordinate system and a predetermined frequency signal, and obtaining a phase angle $θ_{pos}$ of the positive sequence component after the comparing result is integrated.

In some embodiments, the phase angle $θ_{pos}$ of the positive sequence component is inputted into the coordinate transformation process from the α-β coordinate system to the d-q coordinate system and the coordinate transformation process from the d-q coordinate system to the α-β coordinate system in the first separation module respectively.

In some embodiments, a phase angle $-θ_{pos}$, corresponding to the phase angle of the positive sequence component, is inputted into the coordinate transformation process from the α-β coordinate system to the d-q coordinate system and the coordinate transformation process from the d-q coordinate system to the α-β coordinate system in the second separation module respectively.

In some embodiments, the step of c further includes a step of adjusting for adjusting the disturbance variable.

In some embodiments, the step of adjusting is performed by a proportional-integral regulator (P1) or a proportional-integral-derivative regulator (PID).

By adopting the phase locking system for the three-phase AC electric grid and the method thereof in the present invention, the positive sequence component corresponding to the electric grid voltage is obtained by performing the coordinate transformation from the α-β coordinate system to the d-q coordinate system and (LPF and) the coordinate transformation from the d-q coordinate system to the α-β coordinate system on the first variable to be separated sequentially through the first separation module, and the negative sequence component corresponding to the electric grid voltage is obtained by performing the coordinate transformation from the α-β coordinate system to the d-q coordinate system and (the regulator and) the coordinate transformation from the d-q coordinate system to the α-β coordinate system on the second variable to be separated sequentially through the second separation module, and thus the positive sequence component and the negative sequence component of the electric grid voltage can be obtained accurately. Additionally, a separation process of the negative sequence component adopts a closed loop compensation mode, and this separation process and the phase locking of the positive sequence component are enhanced by each other, making the whole phase locking process converge rapidly, thereby obtaining a pure positive sequence component quickly and increasing the phase locking accuracy.

BRIEF DESCRIPTION OF THE DRAWINGS

After reading specific embodiments of the present invention with reference to the accompanying drawings, readers can understand various aspects of the present invention more clearly, wherein.

DETAILED DESCRIPTION

In order to make the technical contents of the present invention more detailed and more comprehensive, various specific embodiments of the present invention are described below with reference to the accompanying drawings, the same reference numbers are used in the drawings to refer to the same or like parts. However, those of ordinary skills in the art shall understand that the embodiments provided below are not used for limiting the scope of the present invention. Moreover, the accompanying drawings are only for illustration and are not drawn to scale.

Before plural specific embodiments of the present invention are described, for purpose of simplicity, a conversion mode that a three-phase voltage of the three-phase AC electric grid is converted to a two-way voltage is called a coordinate transformation from an abc coordinate system to an α-β coordinate system for short, or called a "pre-transformation"; a coordinate transformation from the α-β coordinate system to a d-q coordinate system is called a "first coordinate transformation" for short; and a coordinate transformation from the d-q coordinate system to the α-β coordinate system is called an inverse transformation of the first coordinate transformation, or called a "second coordinate transformation". Those of ordinary skills in the art shall understand that the terms such as "first" and "second" only represent a title, and are not intended to mean any specific sequence, unless expressly specified otherwise.

Specific embodiments in various aspects of the present invention are further described in details below with reference to the accompanying drawings.

Figure 1:
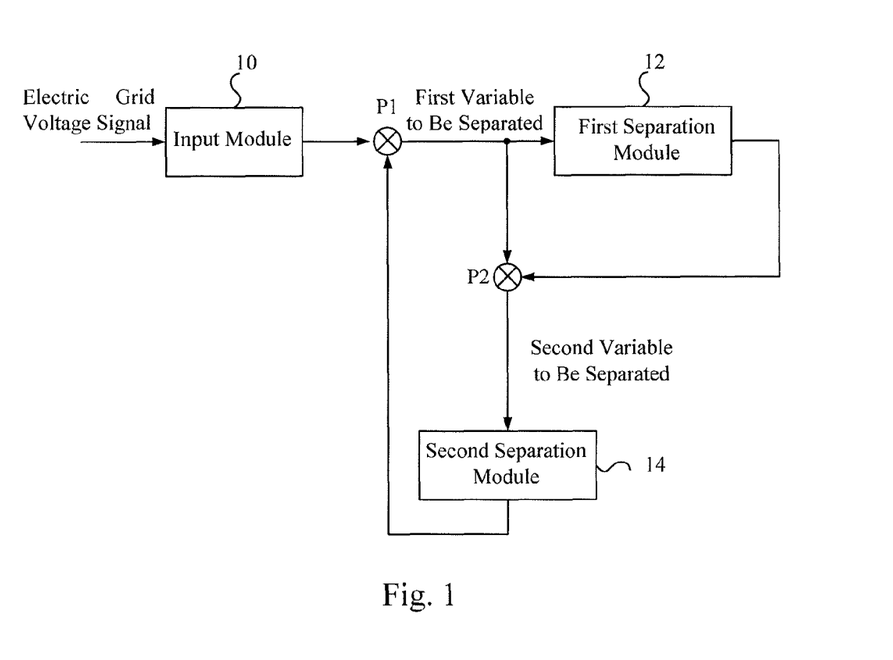
FIG. 1 illustrates a schematic structure diagram of a phase locking system for a three-phase AC electric grid according to an aspect of the present invention.

FIG. 1 illustrates a schematic structure diagram of a phase locking system for a three-phase AC electric grid according to an aspect of the present invention. Referring to FIG. 1, the phase locking system includes an input module 10, a first separation module 12 and a second separation module 14. The input module 10 receives a three-phase voltage of the three-phase AC electric grid, and converts the three-phase voltage to a two-way voltage through the pre-transformation. For example, when the three-phase AC electric grid is unbalanced, after pre-transformation, the voltage of each way includes both a positive sequence component and a negative sequence component, instead of including only the positive sequence component. As described above, here the disturbance variable which mainly includes the negative sequence component makes a great impact on separating out a pure forward fundamental component, and the phase locking system of the present invention mainly solves an actively separation problem of the disturbance variable, so as to phase lock accurately based on the pure forward fundamental component.

The first separation module 12 is used for obtaining the positive sequence component corresponding to the voltage of each way by performing the first coordinate transformation and the second coordinate transformation on a first variable to be separated sequentially. The second separation module 14 is used for obtaining the negative sequence component corresponding to the voltage of each way by performing the first coordinate transformation and the second coordinate transformation on a second variable to be separated sequentially, The first separation module 12 and the second separation module 14 forms a closed loop feedback. For example, an output end of the first separation module 12 is connected to an input end of the second separation module 14 through a node P2, and an output end of the second separation module 14 is connected to an input end of the first separation module 12 through a node P1. In a specific embodiment, the first variable to be separated includes the positive sequence component of the voltage and at least one part of the disturbance variables. After the first variable to be separated is separated by the first separation module, an output signal from the first separation module includes the positive sequence component of the voltage and a relatively small part of the disturbance variables. After passing through the node P2, the positive sequence component and the relatively small part of the disturbance variables are subtracted from the positive sequence component in the first variable to be separated and the at least one part of the disturbance variables, and remained disturbance variables are introduced as the second variable to be separated into the second separation module 14 to be separated. After a balance of the closed loop feedback is reached, the first separation module 12 outputs the pure positive sequence component, and thus achieves a precise phase locking.

It should be pointed out that each line with an arrow in FIG. 1 is only an exemplary signal path, and is not used for designating the number of signals. For example, an electric grid voltage signal introduced into the input module 10 includes the three-phase voltages $U_a$, $U_b$ and $U_c$ when the three-phase AC electric grid is unbalanced, and a voltage signal outputted by the input module 10 includes two-phase voltages $V_{grid\alpha}$ and $V_{grid\beta}$ after pre-transmission. Accordingly, the node P1 and the node P2 respectively include a first partial node and a second partial node corresponding to the two-way voltages $V_{grid\alpha}$ and $V_{grid\beta}$, which are further described hereafter with reference to FIGS. 2 and 5.

In a specific embodiment, the node P1 and/or the node P2 may be set correspondingly as a vector processing unit, such as an adder, a subtracter or a superposed circuit. Those of skills in the art will understand that a design form of the node P1 and/or the node P2 mentioned above is only illustrative, and other design forms of the node P1 and/or the node P2 which may exist currently or be created later are applicable to the present invention, and also should fall into the scope of the present invention. These design forms are incorporated herein in a reference manner.

In another specific embodiment, the phase locking system is applied to a wind power generation system. In a further specific embodiment, the phase locking system is applied to a solar power generation system. This is because that for the wind power generation system or the solar power generation system, a power generation system should be incorporated into a three-phase AC electric grid through a grid-connected frequency changer, and when the three-phase AC electric grid is unbalanced, it is not accurate to phase lock based on the positive sequence component in existing solutions, so that the current transformer is failed and even more seriously the current transformer may be burned. In other words, the phase of generated current is incorrect, active and reactive power does not meet the requirements of main controller. In view of this, the disturbance variable in the electric grid voltage is separated actively by the phase locking system of the present invention, so as to obtain the pure positive sequence component, not only increasing a phase locking velocity, but also increasing a phase locking accuracy.

Figure 2:
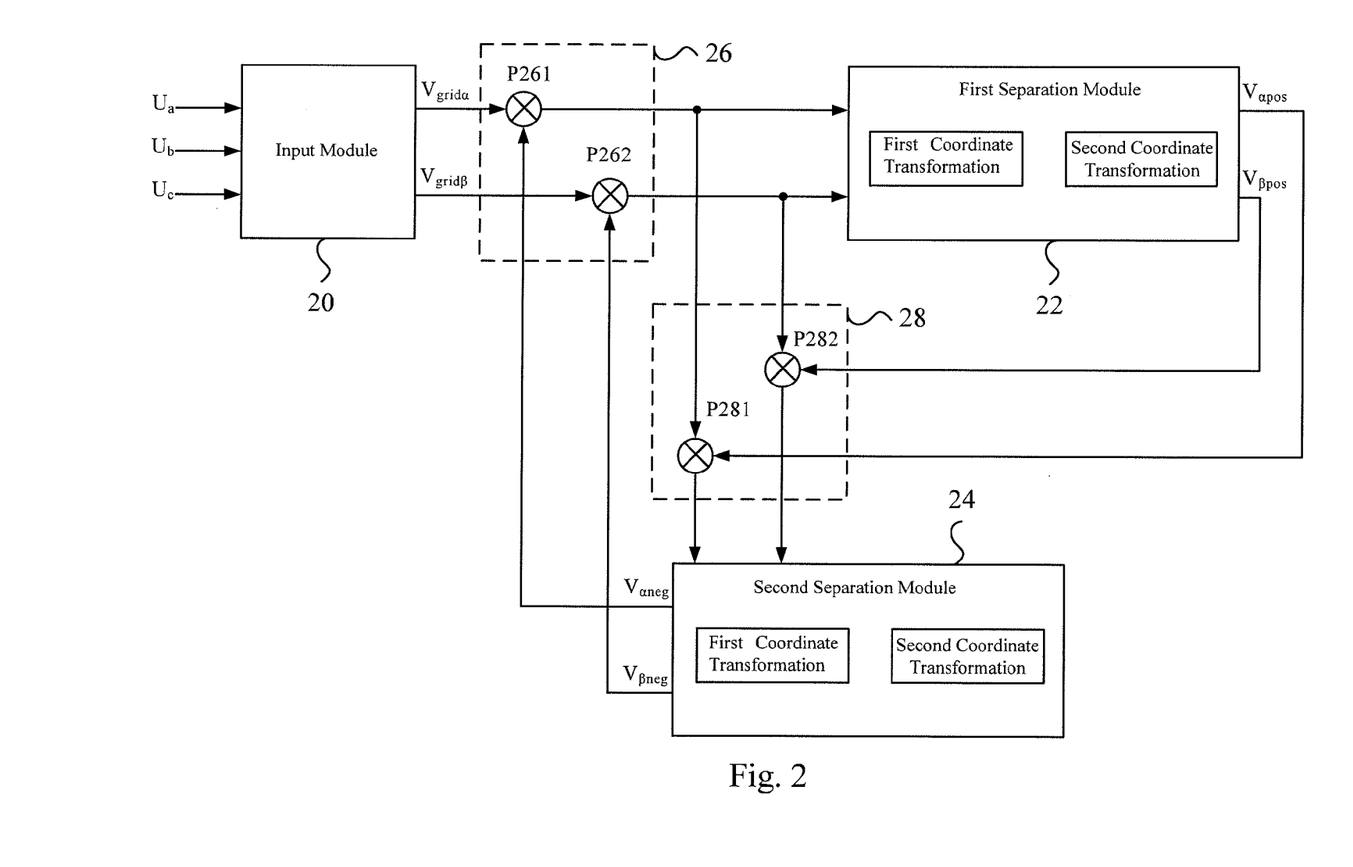
FIG. 2 illustrates a structural block diagram of a preferred embodiment of the phase locking system in FIG. 1.

FIG. 2 illustrates a structural block diagram of a preferred embodiment of the phase locking system in FIG. 1. Referring to FIG. 2, the phase locking system includes an input module 20, a first separation module 22, a second separation module 24, a first superposing module 26 and a second superposing module 28. In the phase locking circuit shown in FIG. 2, the input module 20, the first separation module 22 and the second separation module 24 are each similar to or the same as the input module 10, the first separation module 12 and the second separation module 14 shown in FIG. 1, and thus for purpose of simplicity, it is not illustrated here any more, and are incorporated herein in a reference manner.

The first superposing module 26 includes a node P261 and a node P262. The node P261 corresponds to the voltage $V_{grid\alpha}$; and the node P262 corresponds to the voltage $V_{grid\beta}$. Particularly, the first superposing module 26 has a first input end, a second input end and an output end, and for example, the first input end is electrically connected to the input module 20, the second input end is electrically connected to an output end of the second separation module 24, and the output end is electrically connected to an input end of the first separation module 22. The first superposing module 26 receives the voltage of each way and the respective negative sequence component thereof, and after superpose a first superposed signal is outputted as the first variable to be separated to the input end of the first separation module 22. That is, the voltage $V_{grid\alpha}$ and the negative sequence component $V_{\alpha neg}$ thereof are introduced into the node P261, so as to output the first variable to be separated corresponding to $V_{grid\alpha}$; and the voltage $V_{grid\beta}$ and the negative sequence component $V_{\beta neg}$ thereof are introduced into the node P262, so as to output the first variable to be separated corresponding to $V_{grid\beta}$.

Similarly, the second superposing module 28 includes a node P281 and a node P282. The node P281 is corresponding to the voltage $V_{grid\alpha}$, and the node P282 is corresponding to the voltage $V_{grid\beta}$. Particularly, the second superposing module 28 has a first input end, a second input end and an output end, and for example, the first input end is electrically connected to the input end of the first separation module 22, the second input end is electrically connected to an output end of the first separation module 22, and the output end is electrically connected to an input end of the second separation module 24. The second superposing module 28 receives the first superposed signal and the positive sequence component, and a superposed signal is outputted as the second variable to be separated to the input end of the second separation module 24. That is, the first variable to be separated and the positive sequence component $V_{\alpha pos}$ thereof are introduced into the node P281, so as to output the second variable to be separated corresponding to $V_{grid\alpha}$; and the first variable to be separated and the positive sequence component $V_{\beta pos}$ thereof are introduced into the node P282, so as to output the second variable to be separated corresponding to $V_{grid\beta}$.

It can be seen from FIG. 2 that the first variable to be separated is separated by entering the first separation module 22, and the separation result thereof enters the second separation module 24 through the superposing module 28; meanwhile, the second variable to be separated is separated by entering the second separation module 24, and the separation result thereof reenters the first separation module 22 through the superposing module 26, so as to form a closed loop feedback. It should be understood that, after the disturbance variable included in the electric grid voltage is compensated by the second separation module 24, the first separation module 22 outputs the pure forward fundamental component. That is, the disturbance variable can be separated out actively through respective separation processes of the first separation module 22 and the second separation module 24 as long as the disturbance variable exists in the superposing unit 26 and/or the superposing unit 28, so as to obtain the pure positive sequence component.

Figure 3:
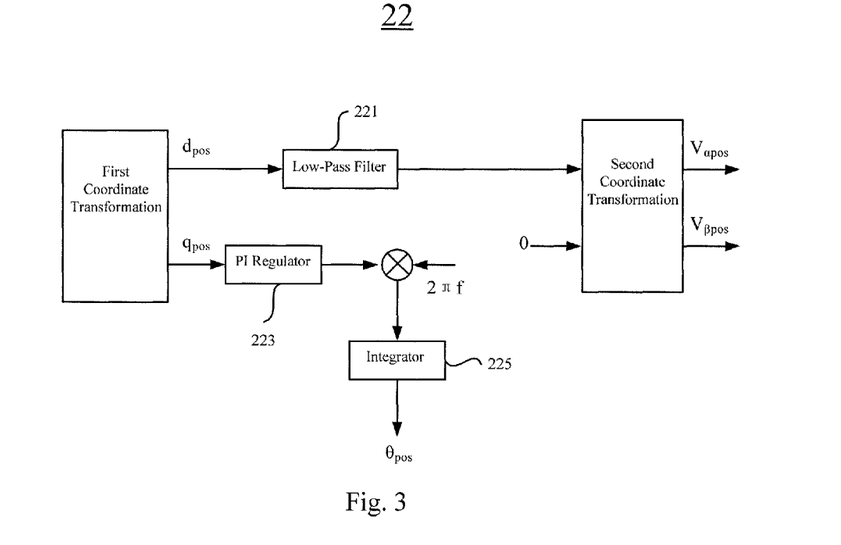
FIG. 3 illustrates a schematic structure diagram of a first separation module of the phase locking system in FIG. 2.

FIG. 3 illustrates a schematic structure diagram of the first separation module of the phase locking system in FIG. 2. Referring to FIG. 3, the positive sequence component $d_{pos}$ at the d-axis and the positive sequence component $q_{pos}$ at the q-axis are obtained respectively by performing the first coordinate transformation on the first separation module 22. In a specific embodiment, the first separation module further includes a low-pass filter 221 so as to low-pass filter the positive sequence component $d_{pos}$ at the d-axis, perform the second coordinate transformation on a filtered signal after low-pass filtering, and obtain the positive sequence components $V_{\alpha pos}$ and $V_{\beta pos}$ after the second coordinate transformation. Therefore, after filtered by the low-pass filter 221, the disturbance variable that may be included in the first variable to be separated after the first coordinate transformation is filtered to a certain degree.

For the positive sequence component $q_{pos}$ at the q-axis, the first separation module 22 further includes a first regulator 223, a comparing unit and an integrator 225. The first regulator 223 is connected with the comparing unit, and the comparing unit is connected with the integrator 225. For example, the first regulator 223 may be a PI or PID. Particularly, the positive sequence component $q_{pos}$ at the q-axis is coupled to an input terminal of the comparing unit through the first regulator 223, a predetermined frequency signal is connected to another input terminal of the comparing unit, and then a phase angle $\theta_{pos}$ of the positive sequence component is outputted through the integrator 225 by comparing the positive sequence component $q_{pos}$ and the frequency signal. Moreover, after obtained, the phase angle $\theta_{pos}$ of the positive sequence component outputted by the integrator 225 is inputted into the transformation process of the first coordinate transformation and the transformation process of the second coordinate transformation in the first separation module 22 respectively. Meanwhile, a phase angle $-\theta_{pos}$, corresponding to the phase angle of the positive sequence component outputted by the integrator 225, is inputted into the transformation process of the first coordinate transformation and the transformation process of the second coordinate transformation in the second separation module 24 respectively.

Figure 4:
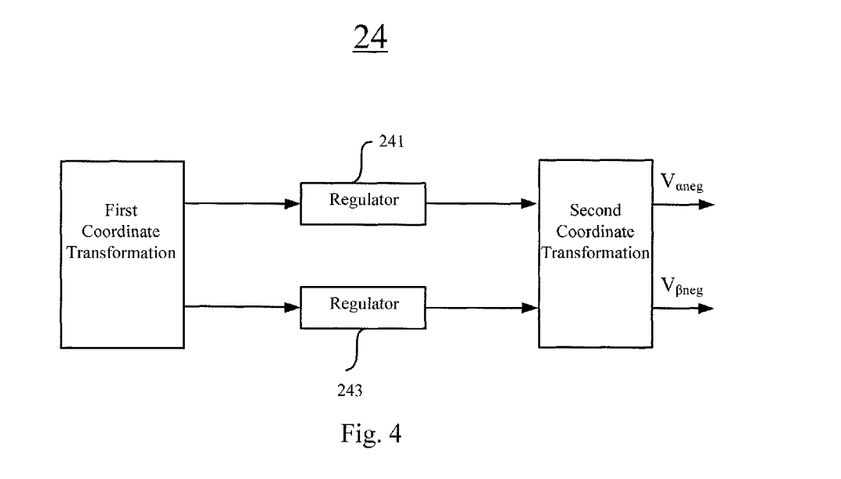
FIG. 4 illustrates a schematic structure diagram of a second separation module of the phase locking system in FIG. 2.

FIG. 4 illustrates a schematic structure diagram of the second separation module of the phase locking system in FIG. 2. Referring to FIG. 4, the second separation module further includes a second regulator for adjusting a transformation result after the first coordinate transformation. In some embodiments, the second regulator includes a regulator 241 and a regulator 243. The regulator 241 is used for adjusting a signal at the d-axis, and the regulator 243 is for adjusting a signal at the q-axis. Particularly, a reference disturbance variable may be preset as zero, and next the disturbance variable in the second separation module 24 after the first coordinate transformation is adjusted by the second regulator. In an embodiment, the regulator 241 and the regulator 243 may be a PI or a PID.

Figure 5:
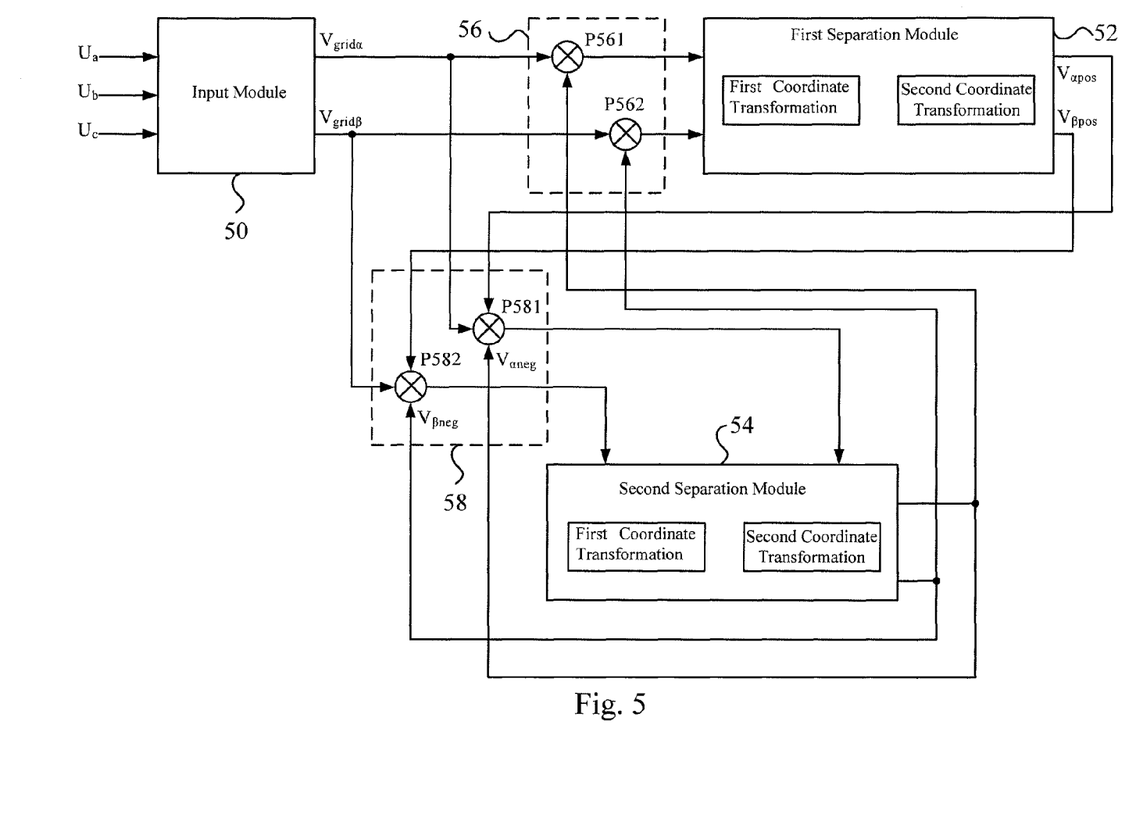
FIG. 5 illustrates a structural block diagram of another preferred embodiment of the phase locking system in FIG. 1.

FIG. 5 illustrates a structural block diagram of another preferred embodiment of the phase locking system in FIG. 1. Referring to FIG. 5, the phase locking system includes an input module 50, a first separation module 52, a second separation module 54, a first superposing module 56 and a second superposing module 58. In the phase locking system shown in FIG. 5, the input module 50, the first separation module 52 and the second separation module 54 are each similar to or the same as the input module 10, the first separation module 12 and the second separation module 14 shown in FIG. 1, and thus for purpose of simplicity, it is not illustrated here any more, and are incorporated herein in a reference manner.

The first superposing module 56 includes a node P561 and a node P562. The node P561 is corresponding to the voltage $V_{grid\alpha}$, and the node P562 is corresponding to the voltage $V_{grid\beta}$. Particularly, the first superposing module 56 has a first input end, a second input end and an output end, and for example, the first input end is electrically connected to the input module 50, the second input end is electrically connected to an output end of the second separation module 54, and the output end is electrically connected to an input end of the first separation module 52. The first superposing module 56 receives the voltage of each way and the respective negative sequence components thereof, and after superpose a second superposed signal is outputted as the first variable to be separated into the input end of the first separation module 52. That is, the voltage $V_{grid\alpha}$ and the negative sequence component $V_{\alpha neg}$ thereof are introduced into the node P561, so as to output the first variable to be separated corresponding to $V_{grid\alpha}$; and the voltage $V_{grid\beta}$ and the negative sequence component $V_{\beta neg}$ thereof are introduced into the node P562, so as to output the first variable to be separated corresponding to $V_{grid\beta}$.

Similarly, the second superposing module 58 includes a node P581 and a node P582. The node P581 is corresponding to the voltage $V_{grid\alpha}$, and the node P582 is corresponding to the voltage $V_{grid\beta}$. Particularly, the second superposing module 58 has a first input end, a second input end, a third input end and an output end, and for example, the first input end is electrically connected to the input end of the first separation module 52, the second input end is electrically connected to an output end of the first separation module 52, the third input end is electrically connected to the output end of the second separation module 54, and the output end is electrically connected to an input end of the second separation module 54. The second superposing module 58 receives the voltage of each way and the respective positive sequence components and negative sequence components thereof, and a superposed signal is outputted as the second variable to be separated to the input end of the second separation module 54.

It should be pointed out that, FIGS. 3 and 4 schematically illustrate the structural block diagrams of the first separation module 22 and the second separation module 24 of the phase locking system in FIG. 2 respectively. However, in the phase locking system shown in FIG. 5 of the present invention, the first separation module 22 and the is second separation module 24 of FIGS. 3 and 4 are also suitable to the first separation module 52 and the second separation module 54, and are included in the embodiment shown in FIG. 5 in a reference manner.

Figure 6:
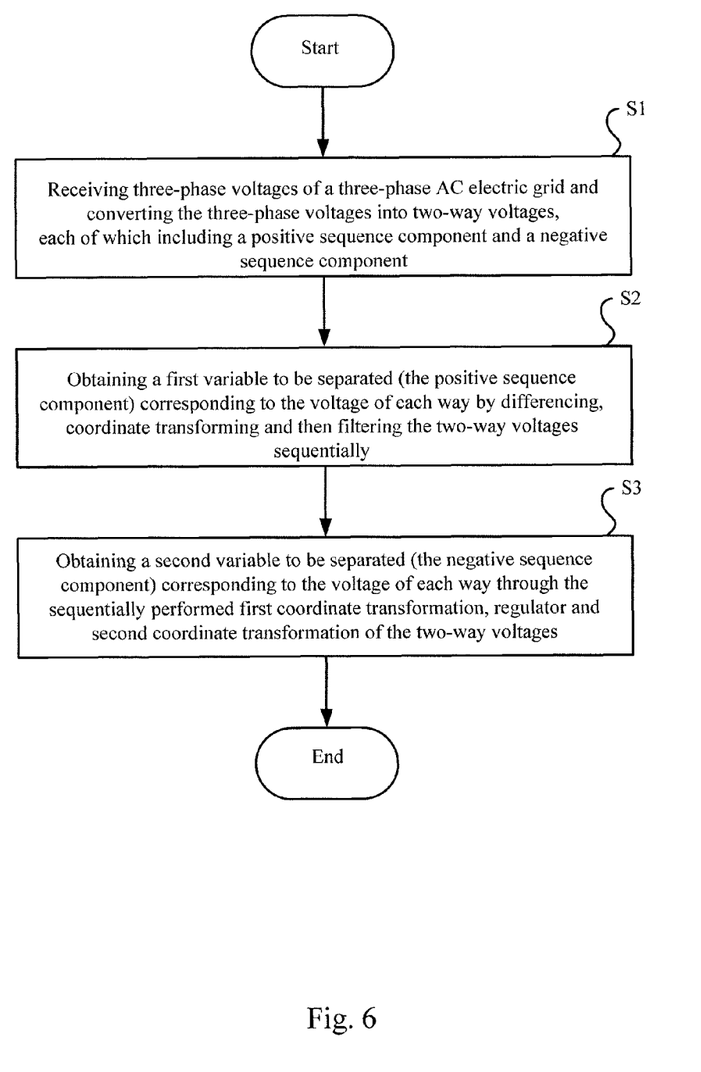
FIG. 6 illustrates a program flow chart of a phase locking method for a three-phase AC electric grid according to another aspect of the present invention.

FIG. 6 illustrates a program flow chart of the phase locking method for the three-phase AC electric grid according to another aspect of the present invention. In the phase locking method, first, step S1 is performed, receiving the three-phase voltages of the three-phase AC electric grid and converting the three-phase voltages to two-way voltages $V_{grid\alpha}0$ and $V_{grid\beta}$, each of which includes a positive sequence component and a negative sequence component. Afterwards, in step S2, the positive sequence components $V_{\alpha pos}$ and $V_{\beta poise}$ corresponding to the voltage of each way are obtained through sequentially performed difference, first coordinate transformation, second coordinate transformation and filter of the two-way voltages $V_{grid\alpha}$ and $V_{grid\beta}$. Next, in step S3, the negative sequence components $V_{\alpha neg}$ and $V_{\beta neg}$ corresponding to the voltage of each way are obtained through the sequentially performed first coordinate transformation, regulator and second coordinate transformation of the two-way voltages $V_{grid\alpha}$ and $V_{grid\beta}$. At last, the voltage of each way is superposed with the corresponding positive sequence components $V_{\alpha pos}$ and $V_{\beta pos}$ and negative sequence components $V_{\alpha neg}$ and $V_{\beta neg}$, so as to separate out the disturbance variable in the voltage of each way and compensate the disturbance variable.

When the disturbance variable is compensated actively, preferably the phase locking method further includes: providing a reference disturbance variable which is preset as zero; differencing the reference disturbance variable (such as the one preset as zero) and the disturbance variable in the voltage of each way so as to obtain a error signal, and eliminating the error by compensating the error signal through a regulator; and obtaining the negative sequence components $V_{\alpha neg}$ and $V_{\beta neg}$ by performing the second coordinate transformation on a compensated signal.

By adopting the phase locking system for the three-phase AC electric grid and the method thereof in the present invention, the positive sequence component corresponding to the electric grid voltage is obtained by performing the first coordinate transformation and the second coordinate transformation sequentially on the first variable to be separated through the first separation module, and the negative sequence component corresponding to the electric grid voltage is obtained by performing the first coordinate transformation and the second coordinate transformation sequentially on the second variable to be separated through the second separation module, thereby accurately obtaining the positive sequence component and the negative sequence component of the electric grid voltage. Additionally, the separation process of the negative sequence component adopts the closed loop compensation mode, and this separation process and the phase locking of the positive sequence component are enhanced by each other, making the whole phase locking process converge rapidly, thereby obtaining a pure positive sequence component quickly and increasing the phase locking accuracy.

In the foregoing, the specific embodiments of the present invention are described with reference to the accompanying drawings. However, those of ordinary skills in the art should understand that various modifications and variations can also be made to the specific embodiments of the present invention without departing from the spirit and scope of the present invention. These modifications and variations all fall in the scope defined by the claims of the present invention.

What is claimed is:

1. A phase locking system for a three-phase alternating current (AC) electric grid, comprising:
   an input module, for receiving three-phase voltages of the three-phase AC electric grid and converting the three-phase voltages to two-way voltages $V_{grid\alpha}$ and $V_{grid\beta}$, each of which comprising a positive sequence component and a negative sequence component;
   a first separation module, for obtaining a positive sequence component $d_{pos}$ at a d-axis and a positive sequence component $q_{pos}$ at a q-axis by performing a coordinate transformation from a α-β coordinate system to a d-q coordinate system on a first variable to be separated, and next outputting positive sequence components $V_{\alpha pos}$ and $V_{\beta pos}$ corresponding to the voltage of each way by performing the coordinate transformation from the d-q coordinate system to the α-β coordinate system on the positive sequence component $d_{pos}$ at the d-axis; and
   a second separation module, for outputting negative sequence components $V_{\alpha neg}$ and $V_{\beta neg}$ corresponding to the voltage of each way by performing the coordinate transformation from the α-β coordinate system to the d-q coordinate system and then the coordinate transformation from the d-q coordinate system to the α-β coordinate system on a second variable to be separated;
   wherein the first separation module and the second separation module are coupled as a closed loop feedback, the second separation module obtains the negative sequence component by adopting a closed loop compensation, and eliminates an error in the first separation module, making the first separation module separate out the positive sequence component for phase locking.

2. The phase locking system of claim 1, further comprising:
   a first superposing module having a first input end, a second input end and an output end, wherein the first input end is coupled to the input module, the second input end is coupled to an output end of the second separation module, and the output end is coupled to an input end of the first separation module, the first superposing module is used for receiving the voltage of each way and the respective negative sequence components thereof, and after superpose a first superposed signal is outputted as the first variable to be separated into the input end of the first separation module; and
   a second superposing module having a first input end, a second input end and an output end, wherein the first input end is coupled to the input end of the first separation module, the second input end is coupled to an output end of the first separation module, and the output end is coupled to an input end of the second separation module, the second superposing module is used for receiving the first superposed signal and the positive sequence component, and a superposed signal is outputted as the second variable to be separated to the input end of the second separation module.

3. The phase locking system of claim 1, further comprising:
   a third superposing module having a first input end, a second input end and an output end, wherein the first input end is coupled to the input module, the second input end is coupled to an output end of the second separation module, and the output end is coupled to the input end of the first separation module, the third superposing module is used for receiving the voltage of each way and the respective negative sequence components thereof, and after superpose a second superposed signal is outputted as the first variable to be separated into the input end of the first separation module; and
   a fourth superposing module having a first input end, a second input end, a third input end and an output end, wherein the first input end is coupled to the input module, the second input end is coupled to the output end of the first separation module, the third input end is electrically connected to an output end of the second separation module, and the output end is coupled to an input end of the second separation module, wherein the fourth superposing module is used for receiving the voltage of each way and the respective positive sequence components and negative sequence component thereof, and a superposed signal is outputted as the second variable to be separated into the input end of the second separation module.

4. The phase locking system of claim 1, wherein the first separation module further comprises a low-pass filter for low-pass filtering the positive sequence component $d_{pos}$ at the d-axis.

5. The phase locking system of claim 4, wherein the first separation module further comprises a first regulator, a comparing unit and an integrator, the first regulator is connected with the comparing unit, and the comparing unit is connected with the integrator, wherein the positive sequence component $q_{pos}$ at the q-axis is coupled to a input terminal of the comparing unit through the first regulator, a predetermined frequency signal is connected to another input terminal of the comparing unit, and a phase angle $\theta_{pos}$ of the positive sequence component is outputted through the integrator by comparing the positive sequence component $q_{pos}$ and the predetermined frequency signal.

6. The phase locking system of claim 5, wherein the phase angle $\theta_{pos}$ of the positive sequence component outputted by the integrator is inputted into a coordinate transformation process from the α-β coordinate system to the d-q coordinate system and the coordinate transformation process from the d-q coordinate system to the α-β coordinate system in the first separation module respectively.

7. The phase locking system of claim 5, wherein a phase angel $-\theta_{pos}$, corresponding to the phase angle of the positive sequence component outputted by the integrator, is inputted into the coordinate transformation process from the α-β coordinate system to the d-q coordinate system and the coordinate transformation process from the d-q coordinate system to the α-β coordinate system in the second separation module respectively.

8. The phase locking system of claim 5, wherein the first regulator comprises a proportional-integral regulator or a proportional-integral-derivative regulator.

9. The phase locking system of claim 1, wherein the second separation module further comprises a second regulator for adjusting the disturbance variable.

10. The phase locking system of claim 9, wherein the second regulator comprises a proportional-integral regulator or a proportional-integral-derivative regulator.

11. A phase locking method for a three-phase AC electric grid, comprising:
    receiving three-phase voltages of the three-phase AC electric grid and converting the three-phase voltages into two-way voltages $V_{grid\alpha}$ and $V_{grid\beta}$, each of which comprising a positive sequence component and a negative sequence component;
    obtaining positive sequence components $V_{\alpha pos}$ and $V_{\beta pos}$ corresponding to the voltage of each way by performing a coordinate transformation from the coordinate system to the d-q coordinate system and a coordinate transformation from the d-q coordinate system to the α-β coordinate system sequentially on a first variable to be separated;
    obtaining negative sequence components $V_{\alpha neg}$ and $V_{\beta neg}$ corresponding to the voltage of each way by performing the coordinate transformation from the α-β coordinate system to the d-q coordinate system and the coordinate transformation from the d-q coordinate system to the α-β coordinate system sequentially on a second variable to be separated; and
    superposing the voltage of each way with the corresponding positive sequence components $V_{\alpha pos}$ and $V_{\beta pos}$ and negative sequence components $V_{\alpha neg}$ and $V_{\beta neg}$, so as to separate out a disturbance variable in the voltage of each way and compensate the disturbance variable.

12. The phase locking method of claim 11, further comprising:
    providing a reference disturbance variable preset as zero;
    differencing the reference disturbance variable and the disturbance variable in the voltage, so as to obtain an error signal, and compensating the error signal through a regulator so as to eliminate the error; and
    obtaining the negative sequence components $V_{\alpha neg}$ and $V_{\beta neg}$ by performing the coordinate transformation from the d-q coordinate system to the α-β coordinate system on the compensated signal.

13. The phase locking method of claim 11, wherein the phase locking method further comprises a first superposing step for:
    receiving the voltage of each way and the respective negative sequence components thereof, and after superpose outputting a first superposed signal as the first variable to be separated into the input end of the first separation module; and
    receiving the first superposed signal and the positive sequence components, and outputting a superposed signal as the second variable to be separated into the input end of the second separation module.

14. The phase locking method of claim 11, wherein the phase locking method further comprises a second superposing step for:
    receiving the voltage of each way and the respective negative sequence components thereof, and after superpose outputting a second superposed signal as the first variable to be separated into the input end of the first separation module; and
    receiving the voltage of each way and the respective positive sequence components and negative sequence components thereof, and outputting a superposed signal as the second variable to be separated into the input end of the second separation module.

15. The phase locking method of claim 11, wherein the step of obtaining positive sequence components $V_{\alpha pos}$ and $V_{\beta pos}$ corresponding to the voltage of each way further comprises a step of filtering, and the step of filtering is used for low-pass filtering the positive sequence component $d_{pos}$ at the d-axis obtained by the coordinate transformation from the α-β coordinate system to the d-q coordinate system.

16. The phase locking method of claim 15, wherein the step of obtaining positive sequence components $V_{\alpha pos}$ and $V_{\beta pos}$ corresponding to the voltage of each way further comprises a step of generating a phase angle, the step of generating a phase angle is used for comparing the positive sequence component $q_{pos}$ at the q-axis obtained by the coordinate transformation from the α-β coordinate system to the d-q coordinate system and a predetermined frequency signal, and obtaining a phase angle $\theta_{pos}$ of the positive sequence component after the comparing result is integrated.

17. The phase locking method of claim 16, wherein the phase angle $\theta_{pos}$ of the positive sequence component is inputted into a coordinate transformation process from the α-β coordinate system to the d-q coordinate system and the coordinate transformation process from the d-q coordinate system to the α-β coordinate system in the first separation module respectively.

18. The phase locking method of claim 16, wherein the phase angle $-\theta_{pos}$, corresponding to the phase angle of the positive sequence component, is inputted into a coordinate transformation process from the α-β coordinate system to the d-q coordinate system and the coordinate transformation process from the d-q coordinate system to the α-β coordinate system in the second separation module respectively.

19. The phase locking method of claim 11, wherein the step of obtaining negative sequence components $V_{\alpha neg}$ and $V_{\beta neg}$ corresponding to the voltage of each way further comprises a step of adjusting, and the step of adjusting is used for compensating the disturbance variable.

20. The phase locking method of claim 19, wherein the step of adjusting is performed by a proportional-integral regulator or a proportional-integral-derivative regulator.

\* \* \* \* \*